(12) United States Patent
McCormack et al.

(10) Patent No.: US 8,271,442 B2
(45) Date of Patent: Sep. 18, 2012

(54) FORMATS FOR DATABASE TEMPLATE FILES SHARED BETWEEN CLIENT AND SERVER ENVIRONMENTS

(75) Inventors: Michael J McCormack, Snohomish, WA (US); Jason Alan Bould, Kirkland, WA (US); Scott Timothy Gardner, Seattle, WA (US); Andrew Robert Miller, Issaquah, WA (US); Timothy Ervin Getsch, Redmond, WA (US); Jonathan Aaron McPherson, Redmond, WA (US); Geoffrey L Griffith, Lafayette, CO (US)

(73) Assignee: Microsoft Corporation, Redmond, WA (US)

( * ) Notice: Subject to any disclaimer, the term of this patent is extended or adjusted under 35 U.S.C. 154(b) by 362 days.

(21) Appl. No.: 12/115,528

(22) Filed: May 5, 2008

(65) Prior Publication Data
US 2009/0276447 A1 Nov. 5, 2009

(51) Int. Cl.
*G06F 7/00* (2006.01)
(52) U.S. Cl. ..................................... 707/640
(58) Field of Classification Search .................. 707/10, 707/736, 640
See application file for complete search history.

(56) References Cited

U.S. PATENT DOCUMENTS

| | | | |
|---|---|---|---|
| 6,996,581 B2 | 2/2006 | Houston et al. | |
| 2003/0208493 A1* | 11/2003 | Hall et al. | 707/100 |
| 2004/0153459 A1* | 8/2004 | Whitten et al. | 707/10 |
| 2005/0108271 A1* | 5/2005 | Hurmiz et al. | 707/102 |
| 2005/0183006 A1 | 8/2005 | Rivers-Moore et al. | |
| 2005/0216887 A1 | 9/2005 | Robertson et al. | |
| 2006/0015806 A1 | 1/2006 | Wallace | |
| 2006/0080329 A1 | 4/2006 | Skibo et al. | |
| 2006/0143563 A1 | 6/2006 | Sauermann | |
| 2006/0161881 A1 | 7/2006 | Saad et al. | |
| 2007/0022128 A1 | 1/2007 | Rothschiller et al. | |
| 2007/0061428 A1 | 3/2007 | Haley et al. | |
| 2007/0083543 A1 | 4/2007 | Chen | |
| 2007/0106951 A1 | 5/2007 | McCormack et al. | |
| 2007/0250481 A1 | 10/2007 | Fiedler | |

OTHER PUBLICATIONS

"Introduction to the Access 2007 Developer Extensions and Runtime", Microsoft Corporation, 2008, pp. 3.
"Create V 14—What's New?", 2007, pp. 5.
Rice, "Introducing the Office (2007) Open XML File Formats", Microsoft Corporation , May 2006, pp. 22.

* cited by examiner

*Primary Examiner* — Truong Vo (57) ABSTRACT

Tools and techniques are described for formats for database template files shared between client and server environments. Systems provided by these tools may include client subsystems that include client-side database management applications that instantiate tables within a database, and instantiate client-specific database template files corresponding respectively to the tables. These database management applications may also instantiate server-specific database template files that correspond to the client-specific template files, and may enable servers to access the server-specific template file. These systems may also include server subsystems that further include server-side database management services that access the server-specific template files, and instantiate server-side template files based thereon. In turn, the database management services may create database applications from the server-side template files.

19 Claims, 6 Drawing Sheets

FORMATS FOR DATABASE TEMPLATE FILES SHARED BETWEEN CLIENT AND SERVER ENVIRONMENTS

BACKGROUND

Database applications may be instantiated from a set of templates, based on parameters that may be gathered through a series of dialogues conducted with users. based on these parameters, the database applications may be generated programmatically, including any appropriate tables, forms, reports, and other related elements.

SUMMARY

Tools and techniques are described for formats for database template files shared between client and server environments. Systems provided by these tools may include client subsystems that include client-side database management applications that instantiate tables within a database, and instantiate client-specific database template files corresponding respectively to the tables. These database management applications may also instantiate server-specific database template files that correspond to the client-specific template files, and may enable servers to access the server-specific template file. These systems may also include server subsystems that further include server-side database management services that access the server-specific template files, and instantiate server-side template files based thereon. In turn, the database management services may create database applications from the server-side template files.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies related to formats for database template files shared between client and server environments. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques related to formats for database template files shared between client and server environments will be described.

Figure 1:
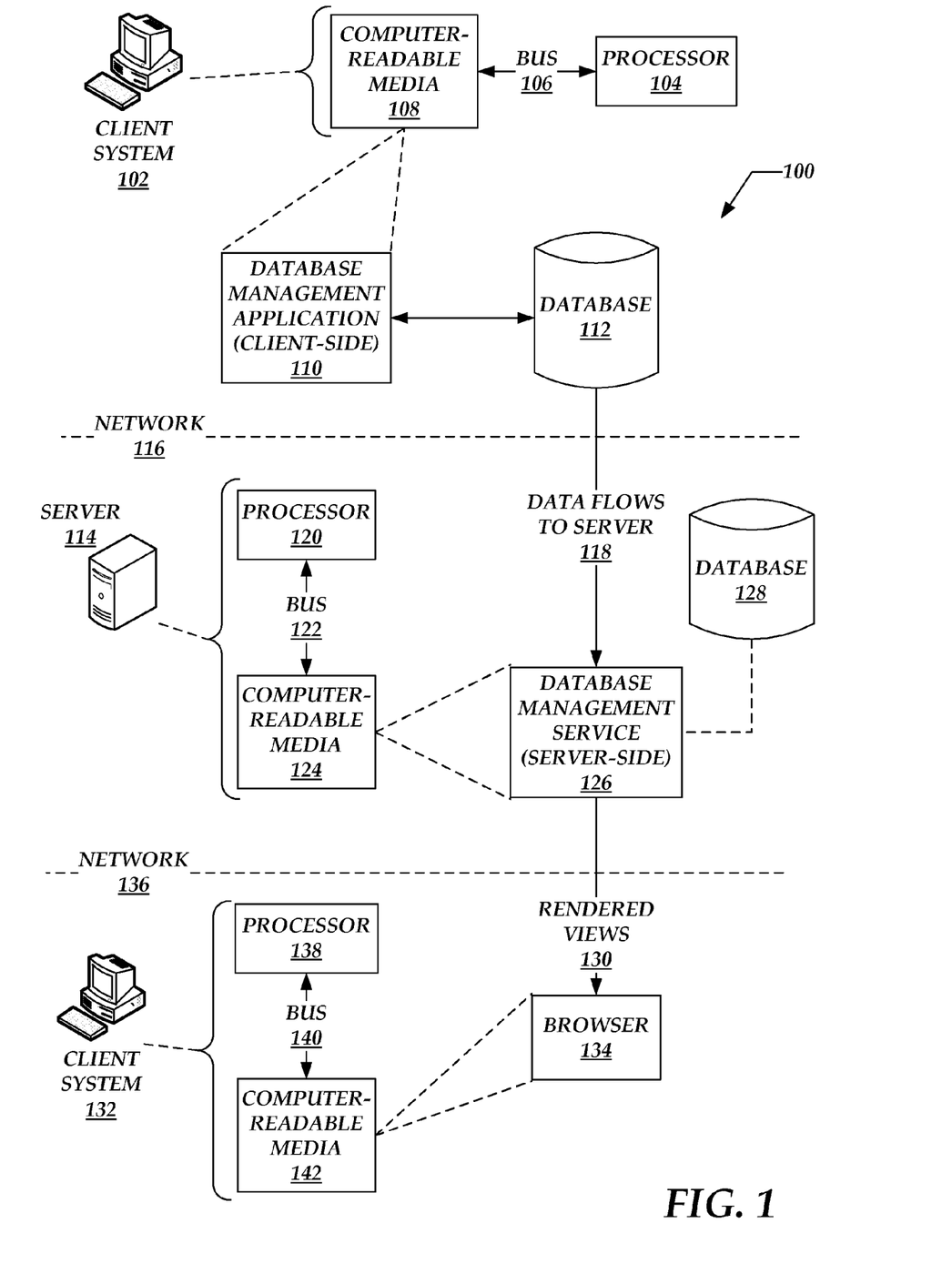
FIG. 1 is a combined block and flow diagram illustrating systems or operating environments related to formats for database template files shared between client and server environments.

FIG. 1 illustrates systems or operating environments, denoted generally at 100, related to formats for database template files shared between client and server environments. These systems or operating environments 100 may include one or more client systems or subsystems 102. Although FIG. 1 provides one example of a client system, implementations of the description herein may include any number of clients systems.

Turning to the client systems 102 in more detail, the client systems may include one or more processors 104, which may have a particular type or architecture, chosen as appropriate for particular implementations. The processors 104 may couple to one or more bus systems 106 chosen for compatibility with the processors 104.

The servers 102 may also include one or more instances of computer-readable storage media 108, which couple to the bus systems 106. The bus systems may enable the processors 104 to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more modules of instructions that, when loaded into the processor 104 and executed, cause the client systems 102 to perform various techniques for providing database template files shared between client and server environments. For instance, FIG. 1 provides a database management application 110 as an example of such modules. The database management application 110 may include a plurality of client-side subsystems or sub-modules that incorporate techniques for managing databases and related tables, as well as incorporating the description herein related to database template files shared between client and server environments. For example only, the client-side aspects of the description herein may be incorporated into products such as the ACCESS® database management system available from Microsoft Corporation of Redmond, Wash., as well as data base management systems available from other vendors.

The database management application 110 may manage one or more instances of databases 112. FIG. 1 provides one example of the database 112 in the interests of clarity, but implementations of this description may include any number of databases. As described in further detail below, the database 112 may include a plurality of tables, with these tables arranged in a relational hierarchy. The database management application 110 and the database 112 may be implemented using object-oriented techniques, or other techniques as appropriate in different implementations.

The client system 102 may communicate with one or more server systems 114 over one or more suitable intermediate wired and/or wireless communications networks 116. In different implementations, the communications networks 116 may be personal, local area, regional, or global in scope. The client system 102 may communicate data or information from the database 112 to server 114, as represented generally at 118.

Turning to the server systems 114 in more detail, the server systems may include one or more processors 120, which may have a particular type or architecture, chosen as appropriate for particular implementations. The processors 120 within the server system 114 may or may not be of the same type and architecture as the processors 114 in the client systems. The processors 120 may couple to one or more bus systems 122 chosen for compatibility with the processors 120. The bus systems 122 in the server system 114 may or may not be of the same type and architecture as the bus systems 106 in the client system 102.

The server systems 114 may also include one or more instances of computer-readable storage media 124, which couple to the bus systems 122. The bus systems may enable the processors 120 to read code and/or data to/from the computer-readable storage media 124. The media 124 may represent storage elements implemented using any suitable technology, including but not limited to semiconductors, magnetic materials, optics, or the like. The media 124 may include memory components, whether classified as RAM, ROM, flash, or other types, and may also represent hard disk drives.

The storage media 124 may include one or more modules of instructions that, when loaded into the processor 120 and executed, cause the server system 114 to perform various techniques for providing database template files shared between client and server environments. For instance, FIG. 1 provides a database management service 126 as an example of such modules. The database management service 126 may include a plurality of server-side subsystems or sub-modules that incorporate techniques for managing databases and related tables, as well as incorporating the description herein related to database template files shared between client and server environments. For example only, the server-side aspects of the description herein may be incorporated into products such as the ACCESS® database management system available from Microsoft Corporation of Redmond, Wash., as well as data base management systems available from other vendors.

The server systems 114 may also include one or more server-side databases 128, or other suitable storage elements.

The server-side databases 128 may store at least portions of the information 118 passed from the client systems, in addition to other information.

In addition to other processing aspects described below, the database management service 126 may enable the server system 114 to provide rendered views 130 of information stored in the server-side databases 128. For example, one or more client systems 132 may present the rendered views 130 to users via browsers or other suitable thin clients, denoted generally at 134. The client system 132 may or may not be the same as the client system 102. More specifically, one client system 102 may upload data flows to the server 114 that represent particular aspects of a given database. In turn, the same client system, or a different client system 132, may receive rendered views of these aspects on a local browser 134.

The servers 114 and the client systems 132 may communicate over suitable communications networks 136, which may or may not be the same as the network 116. Generally, however, the above description of the network 116 applies equally to the network 136.

Turning to the client systems 132 in more detail, these client systems may include one or more processors 138, which may have a particular type or architecture, chosen as appropriate for particular implementations. The processors 138 within the client system 132 may or may not be of the same type and architecture as the processors 104 and 120, included respectively in the client system 102 and the server system 114. The processors 138 may couple to one or more bus systems 140 chosen for compatibility with the processors 138. The bus systems 140 in the client system 132 may or may not be of the same type and architecture as the bus systems 106 and 122, included respectively in the client system 102 and the server system 114.

The client systems 132 may also include one or more instances of computer-readable storage media 142, which couple to the bus systems 140. The bus systems may enable the processors 138 to read code and/or data to/from the computer-readable storage media 142. The media 142 may represent storage elements implemented using any suitable technology, including but not limited to semiconductors, magnetic materials, optics, or the like. The media 142 may include memory components, whether classified as RAM, ROM, flash, or other types, and may also represent hard disk drives.

The computer-readable media 142 may include modules of software instructions that, when loaded into the client systems 132 and executed, enable the client systems to receive and present the rendered views 130 as provided by the server systems 114. The browser component 134 provides a non-limiting example of such software instructions.

Having described the overall operating environments or systems 100 in FIG. 1, the discussion now turns to a more detailed description of client-side components, such as the database management application, data bases, and related template files. This description is now provided with FIG. 2.

Figure 2:
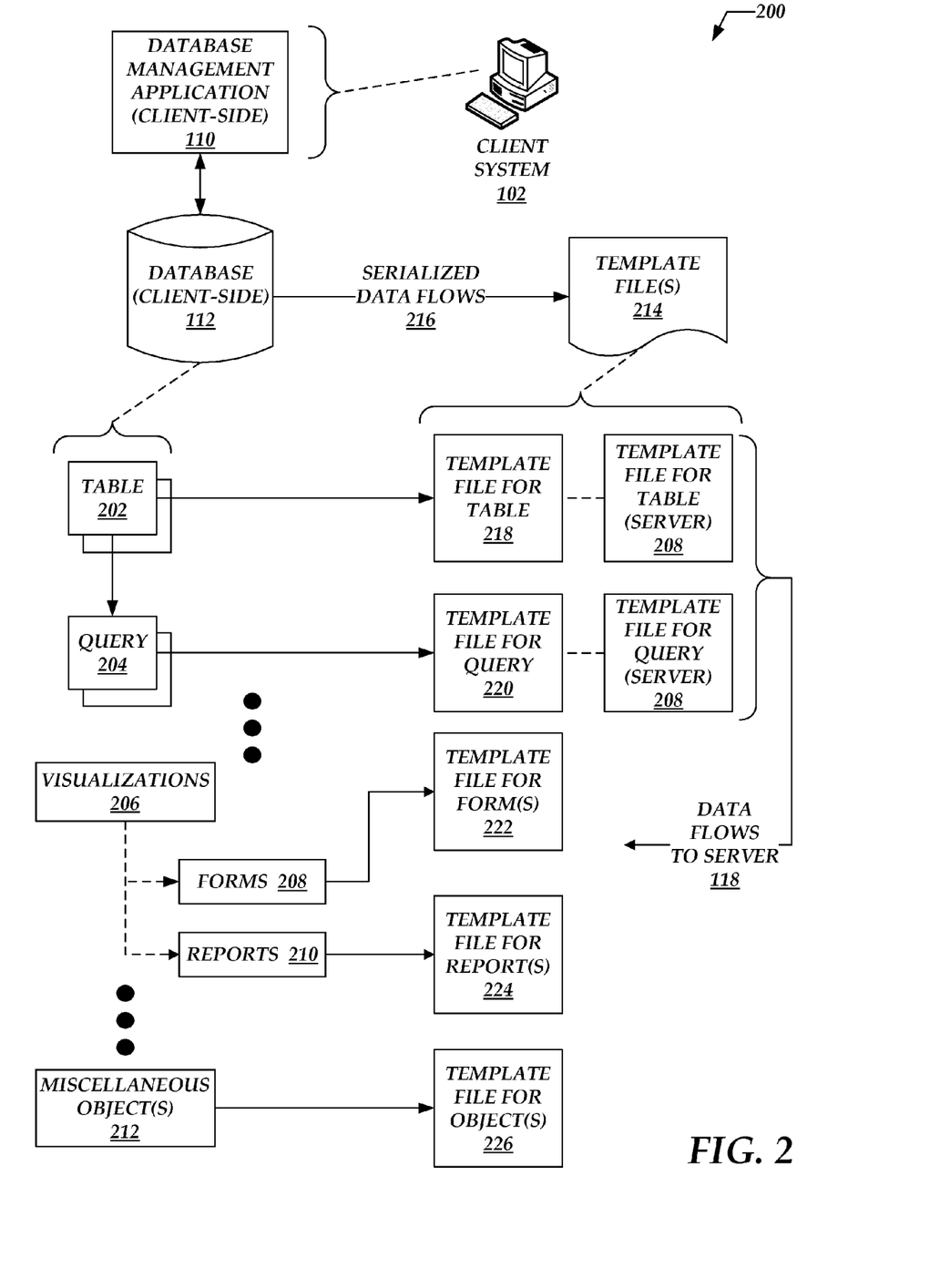
FIG. 2 is a combined block and flow diagram illustrating client-side components and data flows related to formats for database template files shared between client and server environments.

FIG. 2 illustrates client-side components and data flows, denoted generally at 200, related to formats for database template files shared between client and server environments. For ease of reference, and not limitation, FIG. 2 may carry forward some reference numbers from previous drawings to refer to similar items. For example, FIG. 2 carries forward from FIG. 1 the client system 102, the client-side data base application 110, and the client-side database 112.

Turning to FIG. 2 in more detail, the client-side database 112 may include one or more tables, denoted generally at 202. In general, these database tables 202 may include or represent atomic units of information, with specific examples of the stored information varying across different possible implementations. For example, these tables 202 may represent customers, employees, or other items as appropriate.

The database 112 may also include one or more queries, denoted generally at 204. These queries 204 may filter the tables, and join them as appropriate to provide suitable for use of the data stored in the tables.

The client-side database 112 may also include one or more instances of visualizations 206, with FIG. 1 illustrating two non-limiting examples of such visualizations as forms 208 and reports 210. For example, the forms 208 may represent dialog boxes, menus, or other suitable user interface (UI) items with which users may interact when performing tasks related to the client-side database 112. In addition, the reports 210 may provide summaries or reports relating to information stored in the tables 202.

The client-side database 112 may also include miscellaneous objects, denoted generally at 212. Examples of these miscellaneous objects may include, but are not limited to, various instances of code, macros, properties, or similar items as appropriate to maintain and administer the client-side database 112.

The database management application 110 may serialize the tables 202, the queries 204, the visualizations 206, the miscellaneous objects 212, and other items stored in the client-side database 112, and represent these items in one or more template files 214. FIG. 2 denotes at 216 the serialized data flows from the client-side database 112 to the template files 214. More specifically, the template files 214 may include representations of different items that were stored in the database 112.

Turning to the template files 214 in more detail, FIG. 2 illustrates a template file 218 that corresponds to the table 202, a template file 220 corresponds to the query 204, a template file 222 that corresponds to the forms object 208, a template file 224 corresponds to the reports object 210, and template files 226 that correspond to the representations of the miscellaneous objects 212. Taken collectively, the template files 218-226 may be used to create other client databases. However, the database management application 110 may instantiate server-specific counterparts to at least some of these template files 218-226. FIG. 2 provides two examples of such server-specific counterparts, denoted at 228 and 230. The server-specific template file 228 corresponds to the client-specific template file 218, both of which provide template representations of the database table 202. Similarly, the server-specific template file 230 corresponds to the client-specific template file 220, both of which provide template representations of the database query 204.

The database management application 110 may make the server-specific template files available to one or more server systems (e.g., 114 in FIG. 1). More specifically, FIG. 2 carries forward the data flows 118 to the server systems, with the server-specific template files 228, 230, and/or other server-specific template files included as at least part of the data flows 118. as described in further detail below, the server systems may instantiate server-based counterparts of the client database 112 using these template files (e.g., 228, 230, or the like).

Having described the client-side components and data flows in FIG. 2, the discussion now proceeds to a description of additional data items that the client-side database may include in the template files. This discussion is now presented with FIG. 3.

Figure 3:
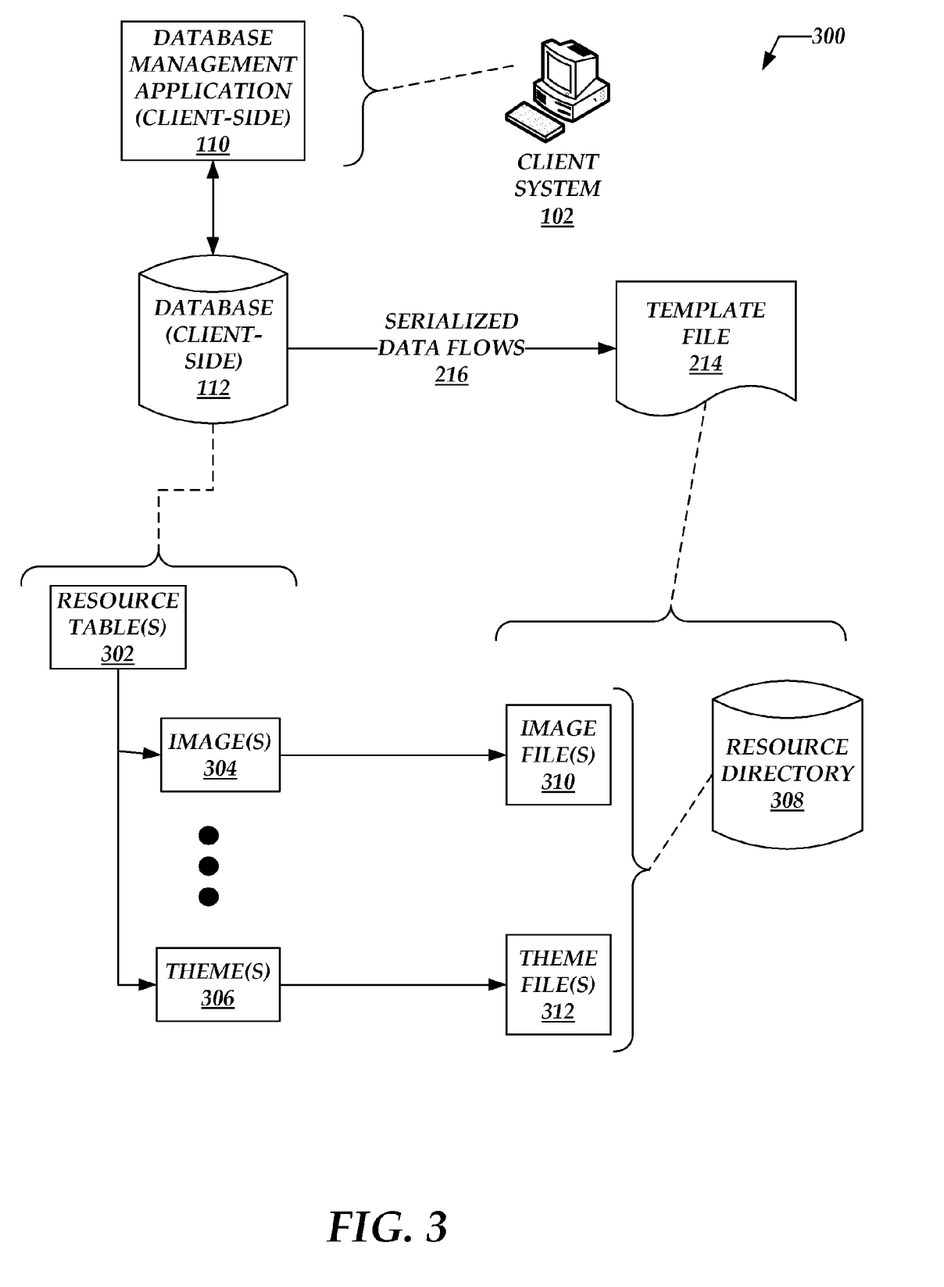
FIG. 3 is a block diagram illustrating additional client-side components and data flows related to formats for database template files shared between client and server environments.

FIG. 3 illustrates additional client-side components and data flows, denoted generally at 300, related to formats for database template files shared between client and server environments. For ease of reference, and not limitation, FIG. 3 may carry forward some reference numbers from previous drawings to refer to similar items. For example, FIG. 3 carries forward from FIG. 1 the client system 102, the client-side database application 110, and the client-side database 112.

Turning to FIG. 3 in more detail, the client-side database 112 may include one or more instances of resource tables 302. In turn, these resource tables 302 may include, for example, representations of various images and/or themes used within the database 112. In some example scenarios, themes may be implemented according to industry-standard techniques, examples of which are documented in ECMA-376 ("Office™ Open XML File Formats"). More specifically, Part 4, Section 5.1.8 of ECMA-376 provides example markup that describing themes. In addition, theme files may be packaged using open packaging conventions as described within ECMA-376. However, implementations that do not use the standards described in ECMA-376 are also possible. Generally, any object that describes formatting information may be used.

FIG. 3 provides example of image objects at 304, and provides examples of theme objects at 306. These images and themes may be presented in connection with forms, reports, and other items within the databases.

Turning to the template file 214, the template file may include a resource directory 308 and further includes template file representations of images, themes, or other types of resources included within the client database 112. FIG. 3 provides an example in which the resource directory includes an image file representation 310 corresponding to the image object 304, and a theme file representation 312 corresponding to the theme object 306. Accordingly, the serialized data flows 216 may represent the objects in the resource tables 302 being converted into template representations within the template file 214.

Generally, objects and resources (including the resource tables 302) within the client database may be saved out as a respected schema file in the structured template file storage 214. When the client database saves its tables out as templates, the client-side database management application may export the data contained within the files, but not necessarily the schema of the files. For example, the resource tables 302 may be exported as a series of image and theme files. In turn, a server system (e.g., 114) may instantiate these files directly on the server, and may create a database application from these files. In another scenario, a client system may instantiate these files, and then may move the files to the server, with the server then instantiating the application. In either scenario, the image and theme files may be available to the database application created.

In some instances, the client-side database application may combine individual images into a composite image to be saved into the template file 214. At the server side, the database management service (e.g., 126) may partition this composite image to recover the individual images upon request in this manner, the template file may reduce the number of downloads between clients and servers.

Having described the additional client-side components and data flows in FIG. 3, the discussion now turns to a description of process flows related to formats for database template files shared between client and server environments. This discussion is now presented with FIG. 4.

Figure 4:
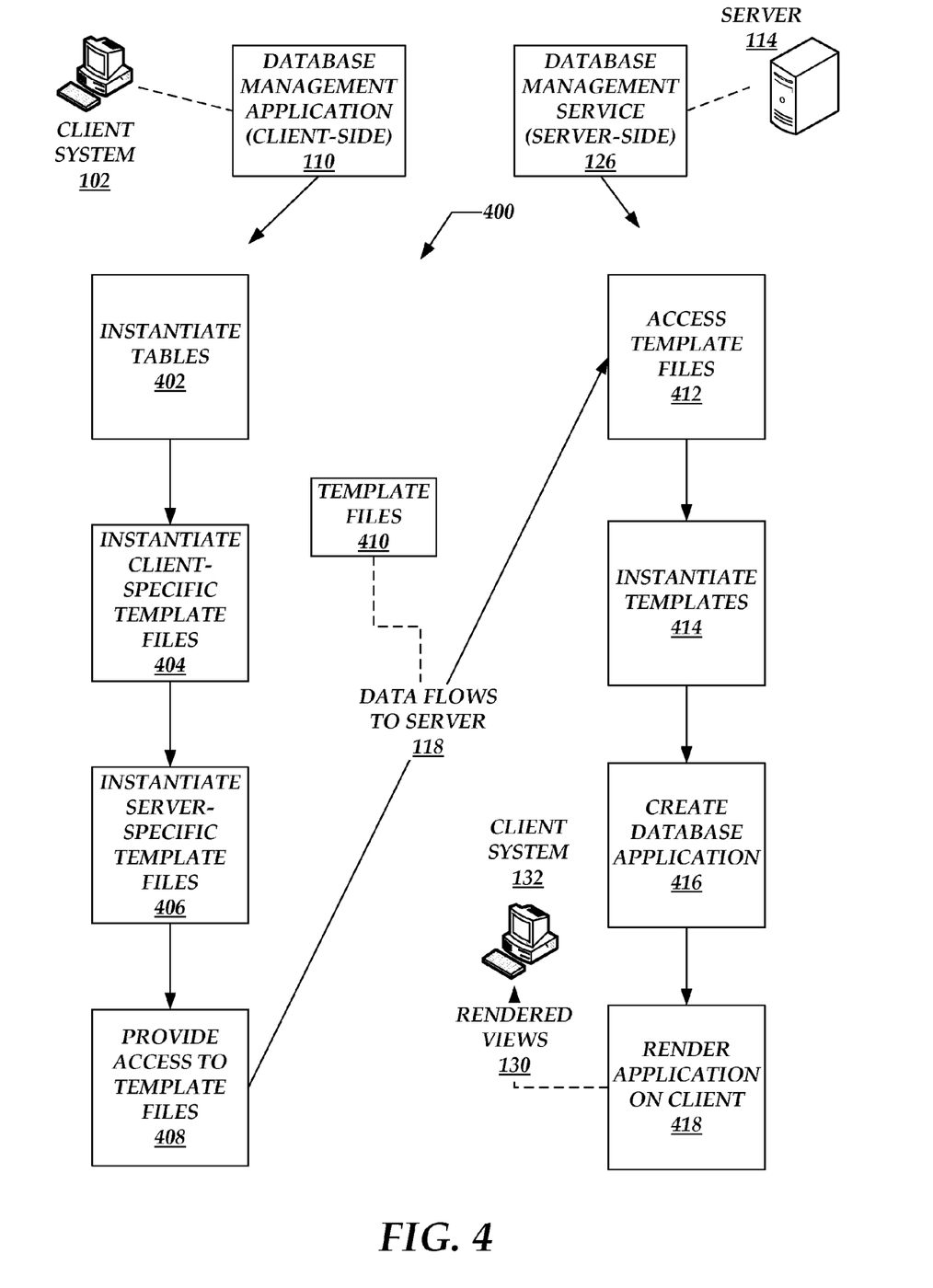
FIG. 4 is a flow diagram illustrating processes related to formats for database template files shared between client and server environments.

FIG. 4 illustrates process flows, denoted generally at 400, related to formats for database template files shared between client and server environments. For ease of reference, and not limitation, FIG. 4 may carry forward some reference numbers from previous drawings to refer to similar items. For example, FIG. 4 carries forward from FIG. 1 the client system 102, the client-side data base application 110, the server 114, the server-side database management service 126, and the client system 132.

In addition, for the purposes of this description, certain portions of the process flows 400 are described in connection with the client system 102 and the server system 114. However, it is noted that in implementations of this description, other components or systems may perform these portions of the process flows 400 without departing from the spirit and scope of this description.

Turning to the process flows 400 in more detail, block 402 generally represents instantiating tables in a client-side data base. For example, previous drawings provide examples of client-side databases at 112, and provide examples of database tables at 202.

Block 404 generally represents instantiating client-specific template files that correspond to the database tables instantiated in block 402. For example, FIG. 2 illustrates template files 214, which may include client-specific template files 218-226.

Block 406 generally represents instantiating one or more server-specific template files, based on the client-specific template files. As examples, FIG. 2 illustrates server-specific template files 228 and 230.

Block 408 generally represents providing access to the server-specific template files instantiated in block 406. For example, block 408 may include transmitting the server-specific template files to one or more server systems (e.g., 114). In another example, block 408 may include making the server-specific template files available for remote access by the server systems. Generally, FIG. 4 denotes at 410 the server-specific template files as shared between the client system 102 and the server system 114. Recalling previous description from FIGS. 1 and 2, the data flows 118 to the server may incorporate the template files 410.

Turning to the server system 114, block 412 represents accessing the server-specific template files 410. In turn, block 414 represents instantiating at least one server-side template file based on the server-specific template files 410.

Block 416 represents creating a database application, based on the server-side templates instantiated in block 414. In this manner, the server system 114 may create a server-side database application that incorporates, for example, the tables and queries existing within the client-side database 112. In addition, the template files 410 may provide a mechanism by which the server system may replicate at least portions of the client-side databases 112. For example, block 416 may include determining whether the input template files include any files that are designated as server-specific (e.g., 228 and 230 in FIG. 2). Server-specific template files may be identified by particular file extensions, for example. If any of these template files are indicated as server-specific, block 416 may include creating a server application that includes, at least in part, the server-specific template files.

Block 418 generally represents rendering the server-side database application, created in block 416, on one or more client systems (e.g., 132). It is noted that the client system 132 on which the server-side database application is rendered may or may not be the same as the client system 102. FIG. 4 carries forward the rendered views as provided to the client system at 130.

The foregoing process flows may enable clients and servers to share client-only objects, server-only objects, and objects shared between the clients and servers. In turn, clients and or servers may build hybrid applications that utilize these objects to take advantage of client features where available, and of server features where available. for example, if the client system 132 or the server 114 instantiates a data base application using the template files 410, this client or server may determine from the template files which features or objects are server-enabled.

Having described the process flows 400 that are related to formats for database template files shared between client and server environments, the discussion now turns to a description of components and data flows related to join and merge operations. This discussion is now presented with FIG. 5.

Figure 5:
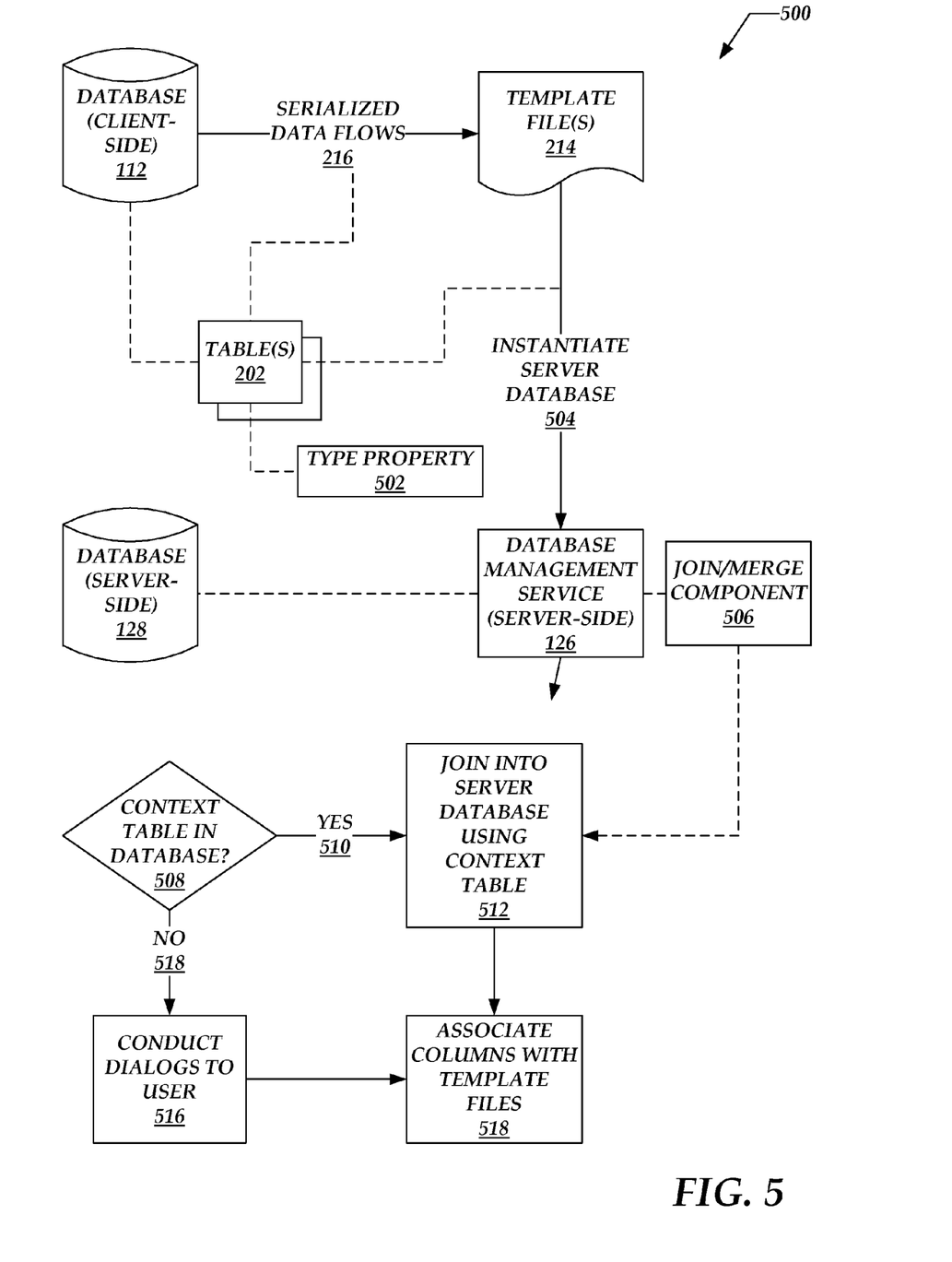
FIG. 5 is a combined block and flow diagram illustrating components and data flows related to join and merge operations facilitated by the formats for database template files shared between client and server environments.

FIG. 5 illustrates components and data flows, denoted generally at 500, related to join and merge operations facilitated by the formats for database template files shared between client and server environments. For ease of reference, and not limitation, FIG. 5 may carry forward some reference numbers from previous drawings to refer to similar items. For example, FIG. 5 carries forward from previous drawings the client-side database 112, the client database tables 202, the serialized data flows 216 between the client database and the template files 214, the server-side database 128, and the server-side database management service 126.

Turning to FIG. 5 in more detail, the serialized data flows 216 may denote creating representations of the database tables 202 within the template files 214. Different database tables 202 may be associated with respective instances of properties 502, which may indicate a type of the table. Examples of table types may include schemas for Contacts, Issues, Tasks, Assets, and Events, as defined in the context of database applications and products, such as the ACCESS™ database software available from Microsoft Corporation of Redmond, Wash. Database software available from other vendors may define equivalent schemas and table types, with the above examples provided only for purposes of this description.

The type properties 502 may be exported as part of the format of the template files 214, which the database management service 126 may use to instantiate the server-side database 128, as represented generally at 504. More specifically, the database management service 126 may include a join/merge component 506 that receives and processes these type properties 502 as included in the template files 214. For example, the database management service 126 may receive a set of input files 214, and join these template files into a new or existing server-site database 128, as now described.

In some implementations, the join/merge component 506 may enable scenarios in which a database template is used to add content to an existing database, as opposed to creating a new database from scratch. For example, an existing database may contain a table based on the above "Contacts" schema. Another template may be instantiated to extend the existing database with the new template containing metadata that specifies how tables in the new template may be joined with a context table in the existing database. As a more specific example, this metadata may specify that a given table (e.g., named "Foo") in this new template may be joined with a context table of schema type "Contacts" in a given manner. In this scenario, the join/merge component 506 may automatically create the relationships or associations between the existing "Contacts" table and the new "Foo" table, as indicated in the new template.

Decision block 508 represents determining whether the server-side database contains the context table. If the server-side database contains a context table, the database management service may take Yes branch 510 to block 512, which represents joining the template files 214 into the server database based on entries within the context table. For example, block 512 may include importing portions of the input template files into the server database based on the type properties.

Returning to decision block 508, if the server-side database does not contain a context table, the database management service 126 may take No branch 514 to block 516. Block 516 represents conducting a dialogue with a user to associate entries in the template files with responding entries in the server database 128.

Block 518 generally represents associating or joining columns within the server database 128 with corresponding features within the input template files 214. The database management service may reach block 518 via either block 512 (joining based on associations expressed in a context table) or block 516 (joining based on results of dialogues with users).

The table type identifier or property 502 may be associated with metadata that allows the database management service to import the client table into the server database, and to merge or join tables in the client database into the server database. In addition, the property 502 may be extensible and not set to a specific value. Instead, groups or communities of particular users or database applications may define these type properties as appropriate in different scenarios.

Having described the join/merge component 506, it is noted that this component (and related processes) may run on client systems, as well as server systems. Thus, any description relating to server-side processing is understood to be illustrative in nature, and does not limit possible implementations of this description.

Having described the components and data flows 500 related to join and merge operations in FIG. 5, the discussion now turns to a description of integrating portions of client-side databases into server-side databases. This discussion is now present with FIG. 6.

Figure 6:
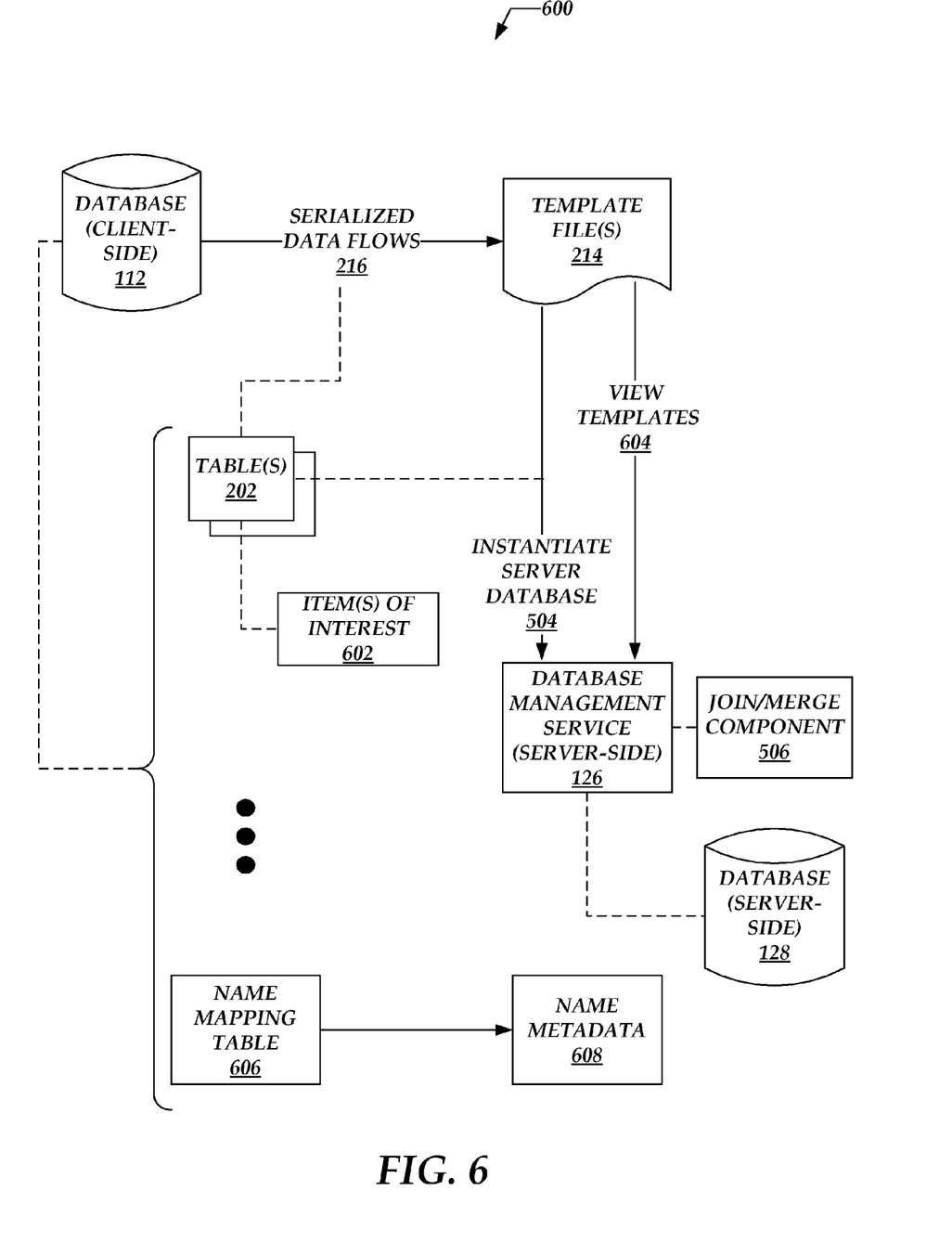
FIG. 6 is a combined block and flow diagram illustrating components and data flows related to integrating portions of client-side databases into server-side databases.

FIG. 6 illustrates components and data flows, denoted generally at 600, related to integrating portions of client-side databases into server-side databases. For ease of reference, and not limitation, FIG. 6 may carry forward some reference numbers from previous drawings to refer to similar items. For example, FIG. 6 carries forward from previous drawings the client-side database 112, the client database tables 202, the serialized data flows 216 between the client database and the template files 214, the server-side database 128, and the server-side database management service 126.

Turning to FIG. 6 in more detail, the database tables 202 may include particular items of interest, denoted generally at 602. For example, these items of interest 602 may include particular columns within the client-side database 112. Non-limiting examples of these columns they represent addresses, by defining streets, street numbers, city, state, zip codes, and the like. Within the template files 214, the files incorporating these items of interest any designated by particular file extensions.

As described above, the server-side database management service 126 may import the template files 214, and may instantiate a server database (e.g., 128) based on these template files, as carried forward at 504. The database management service 126, or more specifically, the join/merge component 506, may recognize the particular file extensions that designate the items 602 within the imported template files 214. When the database management service 126 recognizes template files with the designated file extensions, it may recognize these template files as discrete portions of database schema that may be added individually and intelligently to the server database 128, rather than added to the server database wholesale. More specifically, the database management service 126 may determine which tables on a client and a server (or columns within tables) are of compatible types, and may "fit" together during a join or merge operation. In some cases, the database management service may accomplish these join in merge operations automatically, without intervention by the user.

In the foregoing manner, the specially-designated items 602 appearing within the template files 214 may provide a mechanism that enables portions of the client database 112 to be integrated individually into the server database 128. Using this mechanism, the database management service 126 may recognize data elements or data organizations that are common to or shared by the client and server databases, and may use this recognition intelligently to import tables 202 from the client database to the server database. For example, returning to the above example in which the client database stores address information, the database management service 126 may recognize that certain tables 202 in the client database 112 store and provide address information. In turn, the database management service may integrate these certain tables into a responding tables in the server database that also store and provide address information.

In another example, the template files 214 may include view templates 604 that describe a given visualization, a given form, a given report, or other filtering or view of tables within the client database 112. In turn, the database management service 126 may import the visualization expressed in the view templates 604, and adapt the schema used to construct the server database 128 to incorporate this visualization, rather than building a new form to replicate the visualization expressed in the view templates 604.

Different extensions defined for the template files may indicate whether a given template file is a schema part template, a view template representing visualizations of tables, a full template that includes tables and forms, or the like. More generally, different extensions may also indicate different formats for template files, or may indicate that particular files contain particular types of information. for example, a database application instantiated according to the description herein may recognize particular file formats, and extract particular types of information from these file formats.

Referring to the bottom of FIG. 6, the client database 112 may include a table 606 that provides information mapping between the names of different items appearing in schemas within the client database. For example, a given form may obtain its information from a first table. Afterwards, the name of this first table may change. the name mapping table may track dependencies between tables and those items that refer to information stored within these tables, and update these dependencies as appropriate when and if the names of particular tables change. In the above example, the given form may access the first table through the name mapping table 606, so that when the name of the first table changes, the name mapping table 606 may accommodate this change. in this manner, the name mapping table 606 may isolate forms, and any other items within the client database that refer to particular tables by name, from changes to the names of such tables.

When entries within the name mapping table 606 are created within the template files 214, the template files may also include name metadata 608 associated with these particular entries. Examples of the metadata 608 may include the original name of a given object, as well as other properties of the object that may identify the object if the name changes. In an example implementation, these properties may include the "type" of the object (e.g., Table, Query, Form, Report, or the like), as well as a globally-unique identifier (GUID) specific to the object.

As an example of the foregoing, assume that the server database 128 is to contain a listing of teachers and students, compiled from contacts stored within the client database 112. Initially, the database management service 126 may begin this process with a template file 214 extracted from the client database, and may create a server database 128 to store these contacts. In turn, the database management service 126 may first import into the server database contact information for students, and may instantiate suitable object representations of particular students. Afterwards, the database management service may direct the server database back to the template files 214, import contact information for teachers, and may instantiate suitable object representations of particular teachers. However, when instantiating object representations for the teachers, objects of the same name may already exist for the students. To resolve any name conflicts, the name mapping table 606 may rename objects as appropriate.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system comprising:
   at least one client subsystem that includes a client-side database management application for:
   instantiating a plurality of tables within a database, the database comprising one or more tables, one or more queries, and one or more visualizations;
   instantiating a plurality of client-specific database template files comprising: table template files corresponding respectively to the tables, query template files corresponding respectively to the queries, and form template files, corresponding to the visualizations;
   storing the plurality of client-specific database template files at the at least one client subsystem, the stored plurality of client-specific database template files including representations of items stored in the plurality of tables within the database;
   instantiating at least one server-specific database template file corresponding to at least one of the client-specific template files, at least one server-specific database template file containing metadata specifying how at least one table in the at least one server-specific database template file may be joined with an existing table; and
   enabling at least one server to access the server-specific template file; and
   at least one server subsystem that includes a server-side database management service for:
   accessing the server-specific template file;
   instantiating at least one server-side template file based on the server-specific template file;
   creating or extending at least one database application from the server-side template file, the database application replicating a portion of the client-side database; and
   rendering the database application on a second client system.

2. The system of claim 1, wherein the database includes at least one resource table that further includes at least one image or at least one theme.

3. The system of claim 2, further comprising a resource directory that includes at least one template file representation corresponds to the image or to the theme.

4. The system of claim 2, wherein the client subsystem is adapted to combine a plurality of images into a composite image, and to provide the composite image to the server subsystem.

5. The system of claim 4, wherein the server subsystem is adapted to partition a composite image and extract individual images upon request.

6. The system of claim 1, wherein the server-side database management service is for rendering the database application on at least one client subsystem.

7. The system of claim 1, wherein the client subsystem includes a template file that further includes at least one view template that expresses a visualization associated with at least one table within the database.

8. The system of claim 5, wherein the server subsystem is adapted to import the visualization expressed in the view template, and to create the database application to incorporate the visualization.

9. The system of claim 1, wherein the database application is a hybrid database application that includes at least one client-specific object instantiated from the client-specific template file, at least one server-specific object instantiated from the server-specific template file.

10. At least one computer-readable storage device having computer-executable instructions stored thereon which, when executed by a computer, cause the computer to perform a method comprising:
   instantiating a plurality of tables within at least one database at a client, the database comprising one or more tables, one or more queries, and one or more visualizations;
   instantiating a plurality of client-specific database template files comprising: table template files corresponding respectively to the tables, query template files corresponding respectively to the queries, and form template files corresponding to the visualizations;
   storing the plurality of client-specific database template files at the client, the stored plurality of client-specific database template files including representations of items stored in the plurality of tables within the at least one database;
   instantiating at least one server-specific database template file corresponding to at least one of the client-specific template files, at least one server-specific database template file containing metadata specifying how at least one table in the at least one server-specific database template file may be joined with an existing table;
   enabling at least one server to access the server-specific template file;
   accessing by a server a server-specific template file that is instantiated based on at least one client-specific template file, the client-specific template file comprising at least one of: a table template file corresponding respectively to a table in a client database, a query template file corresponding respectively to a query in the client database, and a form template file corresponding to a visualization in the client database;

instantiating at least one server-side template file based on the server-specific template file;

storing the at least one server-side template file at the server;

creating at least one database application from the server-side template file, the database application replicating a portion of the client database; and rendering the database application on a second client.

11. The storage medium of claim 10, further comprising instructions for defining at least one type property associated with at least one of the tables, and for incorporating the type property into a database template file corresponding to the at least one table.

12. The storage medium of claim 10, further comprising instructions for defining a name mapping table that maps a name of at least a first one of the tables to at least a second name.

13. The storage medium of claim 12, further comprising instructions for storing name metadata that is associated with the name mapping table.

14. The storage device of claim 10, wherein the instructions for accessing a server-specific template file include instructions for accessing a template file that includes at least one type property corresponding to a client database table represented within the client-specific template file.

15. The storage device of claim 14, further comprising instructions for joining at least part of a client database into a server database, based on the type property.

16. The storage device of claim 14, further comprising instructions for identifying, based on the type property, at least one column of a client database for joining with a corresponding column in the server database.

17. The storage device of claim 15 further comprising instructions for determining whether the server database includes a context table.

18. The storage device of claim 15, further comprising instructions for joining at least part of the client database into the server database using a context table.

19. The storage device of claim 15, further comprising instructions for conducting a dialogue with at least one user to associate at least part of the client database with at least part of the server database.

* * * * *